DEFENSIVE PUBLICATION T861016

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 8, 1969

861 O.G. 367

555,667

VINYLIDENE CHLORIDE COPOLYMER COATED ON A PROPYLENE BASED POLYMER SHEET

Dennis Poller, 734 N. Broad St., Elizabeth, N.J. 07208

Filed June 7, 1966. Published Apr. 8, 1969

Class 161—254

No Drawing. 14 Pages Specification

Extrusion coated polypropylene based laminates exhibiting excellent short and long term blocking properties are formed by extruding onto sheets of predominantly crystalline polypropylene and of copolymers of propylene and ethylene a polymer mixture consisting of vinylidine chloride-vinyl chloride copolymers and vinyl chloride-vinyl acetate copolymers with or without additional amounts of poly-(methylmethacrylate) followed by a biaxial orientation operation on the composite material. The laminates so formed are readily heat-sealable and are attractive materials for packaging applications.